2,882,300

PREPARATION OF ACRYLIC AND SUBSTITUTED ACRYLIC ACID ESTERS FROM SATURATED ACID ESTERS

Milton A. Perry and Alfred G. Robinson, Kingsport, Tenn., assignors to Eastman Kodak Company, Rochester, N.Y., a corporation of New Jersey No Drawing. Application April 28, 1958
Serial No. 731,137

9 Claims. (Cl. 260—486)

This invention relates to the preparation of unsaturated esters homologous with alkyl acrylates from α-substituted esters having at least one hydrogen on the β-carbon atom, and more especially to the preparation of alkyl acrylates from corresponding alkyl isobutyrates.

Alkyl esters of saturated fatty acids have been previously employed for the preparation of the corresponding unsaturated esters. For example, methyl isobutyrate has been dehydrogenated to methyl methacrylate using various metal element catalysts. The products obtained in each case had the same number of carbon atoms in the acrylic radical as the starting saturated ester. It was surprising, therefore, to find that on heating saturated α-alkyl substituted esters to elevated temperatures, in the presence of a trialkyl phosphate, the α-alkyl groups split off to give unsaturated esters having a lesser number of carbon atoms in the resulting acrylic radical than the starting ester materials. Thus, lower alkyl esters of, for example, isobutyric acid gave by the process of our invention the corresponding alkyl esters of acrylic acid. The process of the invention is of great value in that it provides a simple and economical method of obtaining these valuable vinyl monomers from readily available starting materials currently in commercial production. These monomeric products are well known and in addition to being valuable intermediates for the preparation of other monomeric compounds are particularly useful for the preparation of resinous thermoplastic polymers that can be readily worked into shaped articles.

It is, accordingly, an object of the invention to provide a new process for preparing unsaturated esters homologous with alkyl acrylates. Another object is to provide a novel process for converting α-alkyl substituted saturated carboxylic esters to the corresponding alkyl acrylates or homologues thereof. Another object is to provide a process for commercial operation in which the conversion is carried out continuously in the vapor phase. Other objects will become apparent from the description in the specification and examples.

In accordance with the invention, we carry out our novel process by passing the starting α-alkyl substituted carboxylic ester in continuous manner over a suitable refrictory material, at a temperature of from 400°–800° C., but preferably at 500°–650° C., with catalytic amounts of a trialkyl phosphate fed simultaneously, condensing the exit gases and isolating the unsaturated ester product by distillation. The reaction is illustrated by the following general equation:

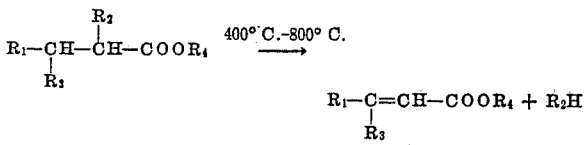

wherein $R_1$ and $R_3$ each represents a hydrogen atom or a lower alkyl group, i.e. containing from 1 to 4 carbon atoms such as methyl, ethyl, propyl, isopropyl, butyl, etc. groups, and $R_2$ and $R_4$ each represents a lower alkyl group containing from 1 to 4 carbon atoms. The process is preferably carried out at normal atmospheric pressures, but the process is also operable at lower and higher than atmospheric pressures. Advantageously, the starting ester and the trialkyl phosphate are vaporized and then passed through a heated reaction tube. We have found that the simultaneous feeding of an oxygen-containing gas such as air is beneficial, but is not necessary for the above reaction to take place. Optimum catalyst concentration is in the range of 0.25–5%, but concentrations as high as 40%, based on the weight of the feed ester, are operable. Contact times employed are from 0.1–4.0 seconds with best results obtained at contact times in the range of 0.25–2.0 seconds.

Suitable starting esters for carrying out the above described process of the invention include the lower alkyl esters such as methyl, ethyl, propyl, isopropyl, butyl, etc. esters of isobutyric, α-methyl butyric, α-ethyl butyric, α-methyl valeric, α-ethyl valeric, α-propyl valeric, α-methyl caproic, α-ethyl caproic, α-propyl caproic, α-butyl caproic, α-methyl enanthic, etc. acids. Suitable trialkyl phosphates inclde those wherein each alkyl group contains from 1 to 4 carbon atoms such as trimethyl phosphate, triethyl phosphate, tripopropyl phosphate, triisopropyl phosphate, tri-n-butyl phosphate, diethyl methyl phosphate, diethyl propyl phosphate, dimethyl propyl phosphate, butyl dipropyl phosphate, etc. The preferred catalyst is triethyl phosphate, $(C_2H_5O)_3PO$.

The following examples will serve to illustrate further the manner of practicing the invention.

Example 1

Two moles (204 g.) of methyl isobutyrate containing 5% by weight triethyl phosphate were vaporized and passed through a tube maintained at 600° C. Air was simultaneously passed through the tube at such a rate that the mole ratio of ester to oxygen was 2:1. A contact time of one second was employed. Condensation of the exit gases gave 192 g. of liquid products which contained 25.5% of methyl acrylate which was recovered by fractional distillation. This amounted to a conversion of 27.5% and an ultimate yield of 71% based on recovered starting material.

In place of the methyl isobutyrate in the above example, there may be substituted an equivalent amount of ethyl, propyl or n-butyl isobutyrate to give a generally similar yield of ethyl acrylate, n-propyl acrylate and n-butyl acrylate, respectively.

Example 2

A run was made in the same fashion as in Example 1 except that no triethyl phosphate was fed with the ester. Only starting material was recovered along with about 5% of low boilers. This result indicated that no methyl acrylate was formed in the absence of triethyl phosphate catalyst.

Example 3

Two moles of methyl isobutyrate were fed in the manner as disclosed in Example 1 except that the temperature was at 650° C. and the ester/oxygen ratio was 3:1. The effluent gases were condensed and found to amount to 164 g. of which 28 g. was methyl acrylate. This amounts to a conversion of 16.3% and a yield of 47% based on recovered starting material.

Example 4

One mole of methyl α-ethylbutyrate containing 2% by weight triethyl phosphate was passed through a hot tube at 635° C. and a contact time of 1.5 sec. A mole ratio of ester to oxygen of 2.5:1 was maintained by feeding air. The condensed products amounted to 125 g. This contained 16 g. of methyl crotonate which amounts to a 16% conversion and 67% yield based on recovered starting material.

*Example 5*

One mole of isobutyl isobutyrate containing 7% by weight of triethyl phosphate was passed through a tube heated to 675° C. at such a rate that a contact time of 0.5 sec. was maintained. Air was fed at such a rate that a mole ratio of ester to oxygen of 1:1 was obtained. The recovered products weighed 130 g. The products contained 28 g. of isobutyl acrylate which amounts to a conversion of 22% and a yield of 61% based on recovered starting material.

By proceeding as described in the above examples, any other of the mentioned starting esters can be employed to give other unsaturated esters of the acrylic acid series in generally similar good yields. For example, methyl α-ethyl valerate gives methyl β-ethylacrylate, methyl α-methylcaproate gives methyl β-propylacrylate, and the like.

The invention has been described in detail with particular reference to preferred embodiments thereof, but it will be understood that variations and modifications can be effected within the spirit and scope of the invention as described hereinabove and as defined in the appended claims.

What we claim is:

1. A process for preparing an unsaturated ester having the following general formula:

$$R_1-C=CH-COOR_4$$
$$|$$
$$R_3$$

wherein $R_1$ and $R_3$ each represents a member selected from the group consisting of a hydrogen atom and an alkyl group of from 1 to 4 carbon atoms and $R_4$ represents an alkyl group of from 1 to 4 carbon atoms, which comprises heating in the vapor phase at a temperature of from 400°–800° C. for a reaction period of 0.1–4.0 seconds, in the presence of trialkyl phosphate wherein each alkyl group contains from 1 to 4 carbon atoms, a saturated ester represented by the following general formula:

$$R_2$$
$$|$$
$$R_1-CH-CH-COOR_4$$
$$|$$
$$R_3$$

wherein $R_1$, $R_3$ and $R_4$ are as above defined and $R_2$ represents an alkyl group of from 1 to 4 carbon atoms.

2. A process for preparing methyl acrylate which comprises heating methyl isobutyrate in the vapor phase at a temperature of from 500°–650° C. for a period of 0.25–2.0 seconds, in the presence of triethyl phosphate.

3. A process for preparing ethyl acrylate which comprises heating ethyl isobutyrate in the vapor phase at a temperature of from 500°–650° C. for a period of 0.25–2.0 seconds, in the presence of triethyl phosphate.

4. A process for preparing isobutyl acrylate which comprises heating isobutyl isobutyrate in the vapor phase at a temperature of from 500°–650° C. for a period of from 0.25–2.0 seconds, in the presence of triethyl phosphate.

5. A process for preparing n-propyl acrylate which comprises heating n-propyl isobutyrate in the vapor phase at a temperature of from 500°–650° C. for a period of from 0.25–2.0 seconds, in the presence of triethyl phosphate.

6. A process for preparing n-butyl acrylate which comprises heating n-butyl isobutyrate in the vapor phase at a temperature of from 500°–650° C. for a period of from 0.25–2.0 seconds, in the presence of triethyl phosphate.

7. A process for preparing methyl crotonate which comprises heating methyl α-ethylisobutyrate in the vapor phase at a temperature of from 500°–650° C. for a period of from 0.25–2.0 seconds, in the presence of triethyl phosphate.

8. The process of claim 1 carried out in continuous manner.

9. The process of claim 1 carried out in continuous manner in the presence of oxygen gas.

No references cited.